July 14, 1959     E. KURTH-CHAPPUIS     2,894,611

FREE WHEEL COUPLING, CHIEFLY FOR WATCHES

Filed Nov. 9, 1955

Inventor:
Erwin Kurth-Chappuis
by:JDelattre-Seguy
Attorney

United States Patent Office 2,894,611
Patented July 14, 1959

2,894,611

FREE WHEEL COUPLING, CHIEFLY FOR WATCHES

Erwin Kurth-Chappuis, Granges, Switzerland, assignor to Kurth Freres S.A. Fabrique de Montres Certina, Granges, Switzerland Application November 9, 1955, Serial No. 545,906

Claims priority, application Switzerland August 30, 1955

2 Claims. (Cl. 192—41)

My invention has for its object a free wheel coupling, chiefly for watches and the like time-pieces of the type including two coaxial cooperating driving and driven members, one of which carries a cam adapted to act on an arcuate member arranged inside a circular groove of the second cooperating member, the cam acting selectively so as to urge the arcuate member against the second coaxial member or else, so as to make it rotate freely with it.

In my improved arrangement, the arcuate member is provided at one end with two surface elements sloping in opposite directions, of which one, turned towards the body of the arcuate member, is subjected to the action of a boss on the cam adapted to lock the arcuate member with reference to the second coupling member, while the other, outwardly directed, sloping surface element is subjected to the action of another boss on the cam which thus drives along the arcuate member freely inside the groove in the second member of the coupling.

I have illustrated by way of example in the accompaying drawings a preferred embodiment of my invention, together with its application to a self-winding watch.

In the said drawings:

Fig. 1 is a plan view of the said embodiment, while

Figure 1:
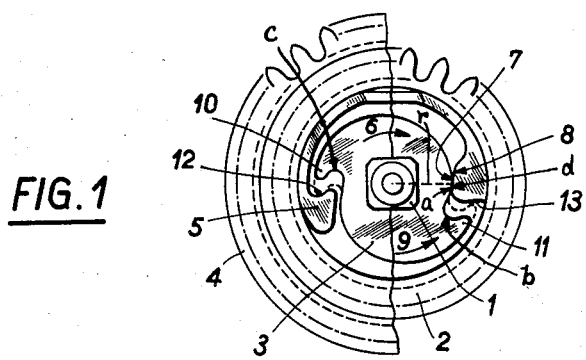

In Fig. 1, the toothed wheel 4 forming the driving member, is rigidly secured to the spindle 1, together with the cam 3. The toothed wheel 2 forming the driven member and arranged coaxially with the wheel 4, is provided with an annular groove inside which is freely mounted the arcuate member 5; this latter member may engage, with a slight elastic pressure, the driven wheel 2.

Thus, considering the front and the rear directions hereinafter and in the claims as corresponding to the directions of the arrow 6 and to the arrow 9 respectively, it is apparent that the cam 3 includes in addition to its general smooth arcuate outline a boss 7 the outline of which merges in said forward direction, through a line forming an angle somewhat less than 90° with the cam radius and directed slightly inwardly of the cam, further through a concave line facing rearwardly towards the radius passing through the boss 7 and lastly through a convex line 11 facing away from said radius into the general outline of the cam. More specifically, it may be stated that this boss, and following oblique concave and convex lines form a short S-shaped section, while there is provided a recessed section lying at a comparatively large angular distance from said S-shaped section, said recessed section merging through a rearwardly facing convex line 10 into the general outline of the cam to the rear of said recessed section.

As to the arcuate slightly elastic member 5 which engages the outer cylindrical wall of the recess in the driven member 2, it includes near its front end facing the direction of the arrow 6 an inner oblique outline section adapted to match the oblique line on the cam 3 for the relative angular setting of the arcuate member with reference to the cam which is illustrated in Fig. 1, said oblique section merging into a front terminal line 13 which is substantially radial to the axis of the rotary members 2—4, said line 13 facing the rounded convex line 11 on the disc outline and lying to the rear thereof.

Furthermore, the opposite rear end of the arcuate member is inturned radially to the rear of the convex line 10 of the cam, so as to form a sloping plane 12 facing said convex line 10.

The operation of the arrangement is as follows: when the spindle 1, driven by the wheel 4, revolves in the direction of the arrow 6, a boss 7 on the cam 3 engages the inner slope 8 at one end of the arcuate member 5. The resultant of the force applied to the contact point between the cam 3 and the arcuate member 5 locks the latter against the wall of the corresponding groove formed in the driven wheel 2. Consequently, the said wheel 2 is driven in the same direction as the wheel 4.

In contradistinction, when the spindle 1, driven by the wheel 4, revolves in the direction of the arrow 9, the contact between the boss 7 on the cam 3 and the sloping surface 8 at the corresponding end of the arcuate member 5 is cut out. The cam continues rotating through a predetermined angle until the bosses 10 and 11 formed on the said cam engage the sloping planes 12 and 13 facing them on the arcuate member 5, whereby the latter is driven freely in the same direction as the cam 3. The driven wheel 2 is then loose with reference to the spindle 1.

Figure 2:
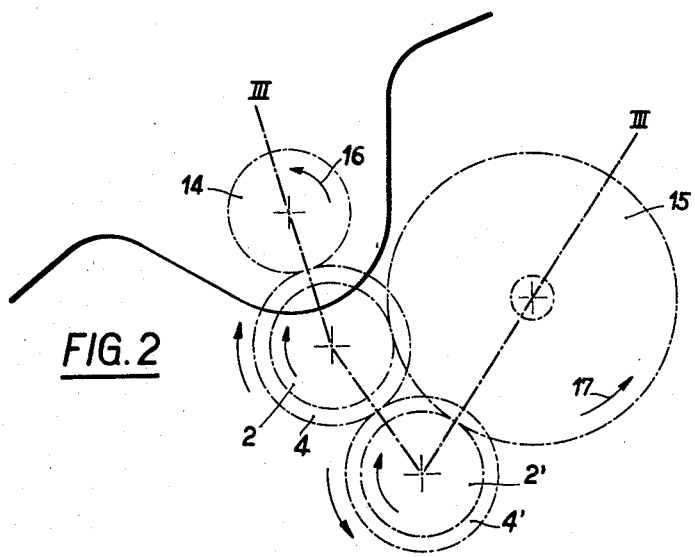
Fig. 2 is a diagrammatic plan view and Fig. 3 an elevational sectional view of the free wheel coupling in connection with a self-winding watch.
Figure 3:
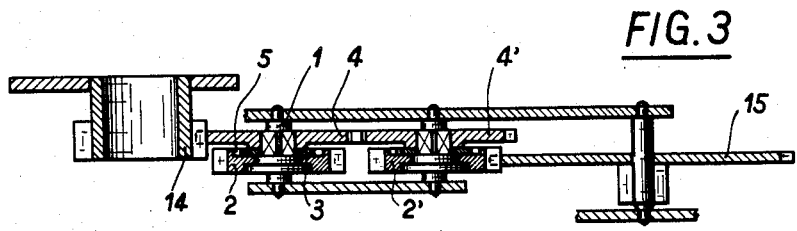

In the application of my invention to the watch illustrated in Figs. 2 and 3, I resort to two arrangements of the type illustrated in Fig. 1. These arrangements are located in a manner such that the driving wheel 4 of the first arrangement meshes with the pinion rigid with the oscillating mass 14 and with the driving wheel 4' of the second arrangement, while the driven wheels 2 and 2' mesh both with the wheel 15. This wheel controls the barrel spindle which is not illustrated.

The operation of last mentioned arrangement is as follows: when the pinion rigid with the oscillating mass revolves in the direction of the arrow 16, it carries along with it the wheels 4 and 4'. The wheel 2 is driven through the coupling means described in the same direction as the wheel 4 and drives in its turn the wheel 15 in the direction of the arrow 17. The wheel 15 drives the wheel 2' in the direction opposed to the direction of rotation of the wheel 4' without disturbing the latter rotation by reason of the free wheeling of the coupling device 4'—2'.

The reverse operation is produced when the pinion rigid with the oscillating mass revolves in the opposite direction.

The arcuate member 5 may be provided advantageously with small projections on its outer periphery so as to further its operative engagement with the wheel 2.

What I claim is:

1. A free wheel coupling chiefly for the oscillating mass of self-winding watches and the like timepieces comprising a first rotary member to be driven into rotation in a predetermined forward direction, said member being provided with a coaxial circular recess, a rotary driving member revolubly and coaxially mounted with reference to the first rotary member, a cam having a generally arcuate outline rigid with said second rotary member, adapted to revolve inside the recess in the first member and including a boss merging in said predetermined forward direction through the succession of a line forming an angle somewhat less than 90° with the cam radius and directed slightly inwardly of the cam of a convex line facing the radius passing through the boss and of a concave line facing rearwardly into the general outline of the cam, and a slightly elastic arcuate member housed inside said recess in the first rotary member, slidingly engaging the outer cylindrical wall of said recess on the outside of the cam and the outline of which includes near its front end facing said predetermined forward direction an inner oblique line adapted to match the oblique line on the cam for a predetermined relative angular setting of the arcuate member with reference to the cam, said oblique line merging into a front terminal line substantially radial with reference to the axis of the rotary members, facing the convex line on the cam outline and lying to the rear thereof in the said forward predetermined direction, the rotation of the cam in unison with the second rotary member in said predetermined direction engaging and wedging together the cam and the arcuate member along their corresponding oblique lines and thereby urging said arcuate member into frictional engagement with the first rotary member to provide synchronous movement of both rotary members and arcuate member and the rotation of the second rotary member and cam in the opposite rearward direction producing an impact of the cam section bounded by the convex line against the front terminal surface of the arcuate member to release the latter.

2. A free wheel coupling chiefly for the oscillating mass of self-winding watches and the like time-pieces comprising a first rotary member to be driven into rotation in a predetermined forward direction, said member being provided with a coaxial circular recess, a rotary driving member revolubly and coaxially mounted with reference to the first rotary member, a cam having a general arcuate outline rigid with said second rotary member, adapted to revolve inside the recess in the first member, the outline of the cam including a short S-shaped section constituted by an oblique line extending at an angle somewhat less than 90° with reference to the cam radius, directed slightly inwardly with reference to its starting point in said predetermined direction, merging at its inner end into a concave line facing the radius passing through the starting point of said oblique line and terminating with a convex line facing rearwardly and merging into the general outline of the cam at the front end of said S-shaped part, the outline of the cam including furthermore a recessed section lying at a comparatively large angular distance from the first-mentioned S-shaped section and merging through a rearwardly facing convex line into the general outline of the cam to the rear of said recessed section and a slightly elastic arcuate member housed inside said recess in the first rotary member, slidingly engaging the outer cylindrical wall of said recess on the outside of the cam and the outline of which includes near its front end facing said predetermined forward direction an inner oblique line adapted to match the oblique line on the cam for a predetermined relative angular setting of the arcuate member with reference to the cam, said oblique line merging into a front terminal line substantially radial with reference to the axis of the rotary members, facing the first convex line on the cam outline and lying to the rear thereof in said forward predetermined direction, the opposite, rear end of the arcuate member being inturned radially to the rear of the last-mentioned convex line of the recessed section of the cam outline, the rotation of the cam in unison with the second rotary member in said predetermined direction engaging and wedging together the cam and the arcuate member along their corresponding oblique lines and thereby urging said arcuate member into frictional engagement with the first rotary member to provide synchronous movement of both rotary members and arcuate member and the rotation of the second rotary member and cam in the opposite rearward direction producing an impact of the cam sections bounded by each rearwardly facing convex line against the front terminal surface of the arcuate member and against the front part of the inturned end of the arcuate member respectively to release said arcuate member.

References Cited in the file of this patent

UNITED STATES PATENTS

| | | |
|---|---|---|
| 2,620,052 | Andersson | Dec. 2, 1952 |
| 2,739,682 | Detwiler | Mar. 27, 1956 |

FOREIGN PATENTS

| | | |
|---|---|---|
| 296,723 | Switzerland | May 1, 1954 |
| 298,947 | Switzerland | Aug. 2, 1954 |
| 300,381 | Switzerland | Oct. 1, 1954 |